United States Patent [19]
Lee et al.

[11] Patent Number: 5,822,453
[45] Date of Patent: Oct. 13, 1998

[54] METHOD FOR ESTIMATING AND ADJUSTING DIGITAL IMAGE CONTRAST

[75] Inventors: Hsien-Che Lee, Penfield, N.Y.; Heemin Kwon, Pittsford, Rep. of Korea

[73] Assignee: Eastman Kodak Company, Rochester, N.Y.

[21] Appl. No.: 763,270

[22] Filed: Dec. 10, 1996

[51] Int. Cl.$^6$ .................................................. G06K 9/00
[52] U.S. Cl. ........................................ 382/169; 358/455
[58] Field of Search .................................... 382/167, 168, 382/169, 224, 274, 279, 170; 358/406, 448, 455, 467, 515, 519, 521, 524

[56] References Cited

U.S. PATENT DOCUMENTS

| | | | |
|---|---|---|---|
| 4,654,722 | 3/1987 | Alkofer | 358/455 |
| 4,731,671 | 3/1988 | Alkofer | 358/455 |
| 4,991,092 | 2/1991 | Greensite | 382/279 |
| 5,046,118 | 9/1991 | Ajewole et al. | 382/169 |
| 5,164,993 | 11/1992 | Capozzi et al. | 382/169 |
| 5,410,617 | 4/1995 | Kidd et al. | 382/169 |

OTHER PUBLICATIONS

The Image Processing Hand–Book, 2nd Edition John C. Russ.
Numerical Analysis, 3rd Edition Richard L. Burden et al.

*Primary Examiner*—Joseph Mancuso
*Assistant Examiner*—Samir Ahmed
*Attorney, Agent, or Firm*—Peyton C. Watkins

[57] ABSTRACT

A method of estimating the scene contrast from a digital image, the method comprises the steps of: forming a Laplacian histogram distribution; determining, from the Laplacian histogram, first and second thresholds which eliminate substantially uniform areas or a substantially textured portion of the digital image; selecting pixels which are based on the first and second thresholds from the digital image; forming a histogram from the sampled pixels; computing a standard deviation of the sampled histogram; and estimating contrast of the digital image by comparing the computed standard deviation with a predetermined contrast for determining contrast of the input image in relationship with the predetermined contrast.

43 Claims, 10 Drawing Sheets

METHOD FOR ESTIMATING AND ADJUSTING DIGITAL IMAGE CONTRAST

FIELD OF THE INVENTION

The present invention relates to digital imaging processing and, more particularly, to a method for estimating and thereafter adjusting contrast of a digital image.

APPENDIX

The disclosure in the appendix of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

BACKGROUND OF THE INVENTION

A typical digital imaging system captures an image and, after various automatic or interactive manipulations, displays the image on a monitor or prints a hardcopy of the image both for permitting human visual viewing. The perceived contrast of the printed or displayed image, as a pleasing reproduction of the original scene contrast, depends mainly on two factors: the scene contrast and the system reproduction contrast.

The scene contrast is affected by the scene illumination (the lighting contrast), the distribution of object reflectance factors (the object contrast), and the distribution of object color (the color contrast).

The system reproduction contrast is determined by the various steps along the imaging chain, such as sensor calibration, tone scale mapping, and output device characteristics. In order to achieve automatic contrast adjustment in digital photofinishing, one needs a method for estimating the scene contrast, and based on this estimate, a method for adjusting the reproduced image contrast or system contrast for optimal visual reproduction.

U.S. Pat. No. 4,731,671 teaches a method for contrast adjustment in digital image processing. This method creates a plurality of predetermined Laplacian response intervals and then computes the Laplacian for each pixel in an input image. The code value for each pixel in the image is then placed in its corresponding Laplacian response interval for accumulating several code value histograms, one for each Laplacian response interval. It then selects the histogram whose shape is closest to a normal distribution The standard deviation of the selected histogram is taken as an estimate of the scene contrast. The standard deviation is used as an estimate of the scene contrast because of the correlation between the standard deviation and the scene contrast. That is, a high standard deviation corresponds to a high scene contrast and a low standard deviation corresponds to a low scene contrast.

The estimated contrast is then compared with a distribution of scene contrasts (i.e., standard deviations from a plurality of scenes) pre-computed from a plurality of random sample of images. If the estimated contrast is higher than the population average, then the image is considered to have a higher than normal contrast and the system reproduction contrast is then adjusted lower so that the printed image will have an image contrast that is closer to the average contrast. If the estimated image contrast is lower than the average, then the system reproduction contrast is raised accordingly.

There are also methods for contrast adjustment that are based on histogram transformation. This class of methods does not explicitly estimate the scene contrast in the input image. The method simply assumes that an image histogram has to be in a certain shape and proceeds to transform it into the desired shape. The best known example is the histogram equalization method.

Still further, a theoretical construct is described by W. A. Richards, "Lightness Scale From Image Intensity Distribution," Applied optics, 21, 14, pp. 2569–2582, 1982. The idea is that a "randomly" sampled log-exposure histogram of an image should have a shape similar to a normal distribution.

Although the presently known and utilized methods for adjusting tone scale in a digital image are satisfactory, they are not without drawbacks. The method of U.S. Pat. No. 4,654,722 seems to perform rather well for most images; however, there are a few situations when there are shortcomings. First, there are two parameters that have to be predetermined: the lower threshold and the width of the Laplacian interval. The patent does not provide an automatic method for setting these two parameters. As a consequence, for some images, the lower threshold is not high enough to exclude noise and textures, therefore, causing the standard deviation of the selected histogram to be unduly biased by large uniform areas (when the noise is higher than the lower threshold) or by busy texture areas (such as grass or trees). Secondly, the selected histogram often exhibits bimodality for overcast scenes with sky in them. Although the scene contrast is low, the standard deviation of the selected histogram is large because of the bimodality caused by the dark grass pixels and the bright sky pixels.

In addition, the above-described histogram transformation method does not have a sound theoretical foundation, and frequently, it produces unacceptable tone reproduction for consumer images. Still further, in the method of W. A. Richards, a drawback arises in defining what constitutes a truly random sampling. Furthermore, another drawback of the histogram modification approach in the prior art is that the resulting tone transformation curve often has too high or too low local contrast in some portions of the curve. Therefore, the processed image does not look pleasing.

Consequently, a need exists for an improved method for estimating the scene contrast and adjusting the reproduction contrast based on this estimated scene contrast.

ADVANTAGES OF THE PRESENT INVENTION

From the above discussion, there are three shortcomings in the prior art for image contrast estimation and adjustment: (1) large uniform areas can produce a bias on the contrast estimate, calculated over the entire image; (2) busy texture areas can produce a bias on the contrast estimate, calculated only on the edge pixels; and (3) contrast adjustment needs to be performed under constrained limits. In the present invention, a method of detecting the uniform areas and the busy texture areas in the input image is developed to solve the first two shortcomings and a method of constructing the final reproduction tone transformation curve within pre-specified contrast limits is used for adjusting the image contrast. A further advantage of this invention is that instead of transforming every image histogram into a fixed-shaped target histogram, such as a normal distribution, the present invention generates an image-dependent target histogram for each image. This greatly reduces the algorithm's sensitivity to sampling error.

SUMMARY OF THE INVENTION

In this invention, the method for estimating the scene contrast from a digital image is to sample only those high contrast pixels in the image and calculate the standard deviation of their log-exposure distribution. The computed standard deviation is taken as a measure of the scene contrast, which is used to compare with similarly calculated statistics from a large population of consumer images. If an input scene contrast is lower than the mean contrast of the precompiled population scene contrasts, then the contrast of the input image will be adjusted higher. If the input scene contrast is higher than the population mean contrast, then the input image contrast is slightly reduced.

In the present invention, the contrast adjustment is accomplished through a process commonly known as histogram modification. The original histogram is mapped (and thus modified) through a tone transformation curve into the target histogram. The present invention includes (1) a target histogram whose shape is derived from and therefore dependent on the original histogram computed from the input image, (2) a tone transformation curve that is constrained to have local slopes between the pre-imposed lower and upper bounds, and (3) a tone transformation curve that includes a fixed point in mid-tone range that maps a certain input code to the output code of the same value. In the preferred embodiment of the invention, this fixed point corresponds to the median of the input histogram and that of the output target histogram. Alternatively, this fixed point can be chosen by the users to maintain the desired white balance of the image.

DETAILED DESCRIPTION OF THE INVENTION

In the below-described preferred embodiment, the computer readable storage medium may comprise, for example; magnetic storage media such as a magnetic disc (such as a floppy disc) or magnetic tape; optical storage media such as an optical disc, optical tape, or machine readable bar code; solid state electronic storage devices such as read only memory (ROM), or random access memory (RAM); or any other physical device or medium employed to store a computer program.

Figure 1:
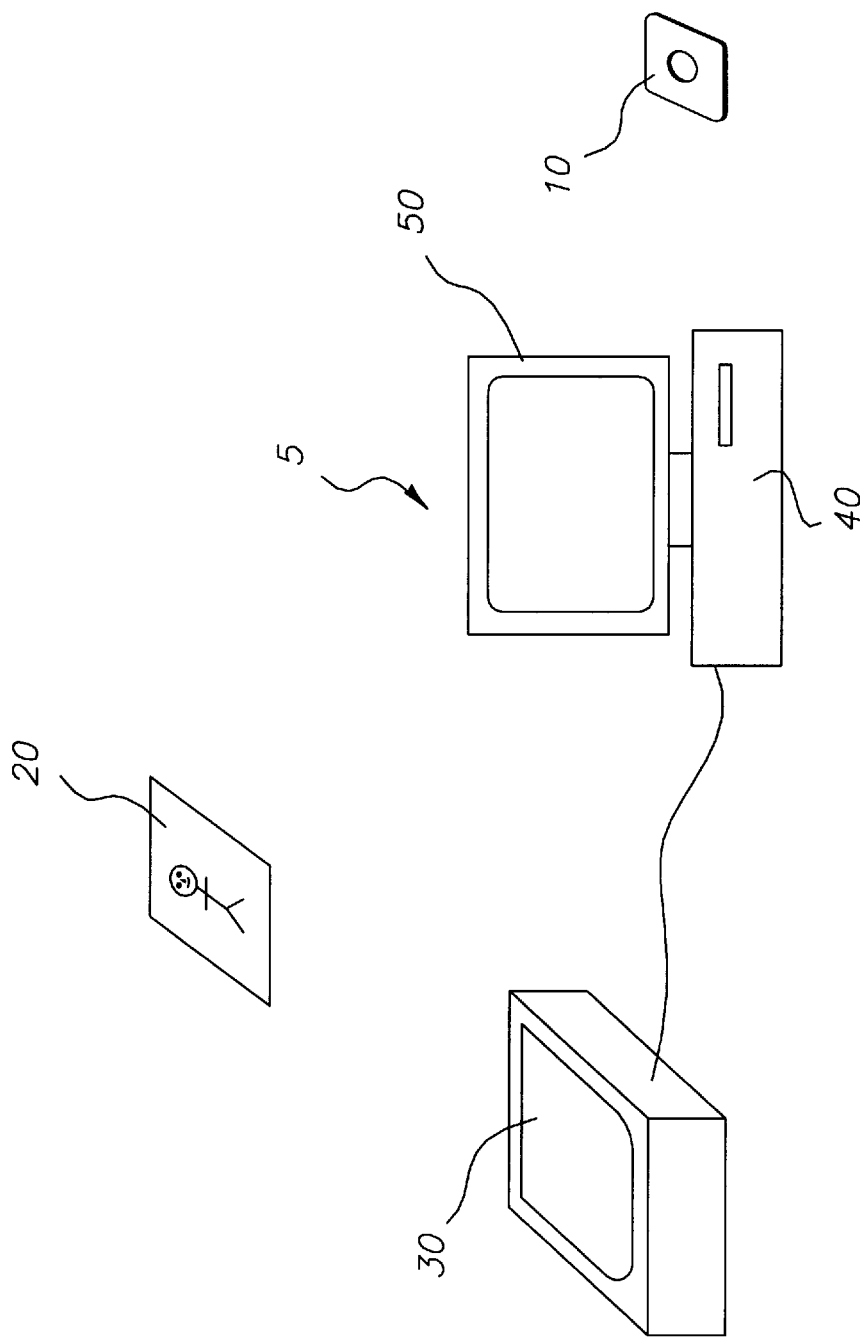
FIG. 1 is a diagram illustrating a typical system for implementing the present invention.

Referring to FIG. 1, there is illustrated a typical general purpose computer system 5 for implementing the software program of the present invention. The software program may be installed for execution on the general purpose computer system 5 via any suitable computer readable storage medium 10, as is well known in the art.

A captured image 20 is input into the general purpose computer 5 via any well known means, such as a scanner 30, where it is digitized and preferably converted into a red, green and blue (RGB) digital image format. The digitized image is transmitted to a central processing unit 40 where it is processed by the software program of the present invention. The digitized image is also preferably calibrated in log-exposure metric by the central processing unit 40; such calibration into log-exposure metric is well known in the art. The digitized image may also be displayed on a monitor 50 during or after processing.

Figure 2:
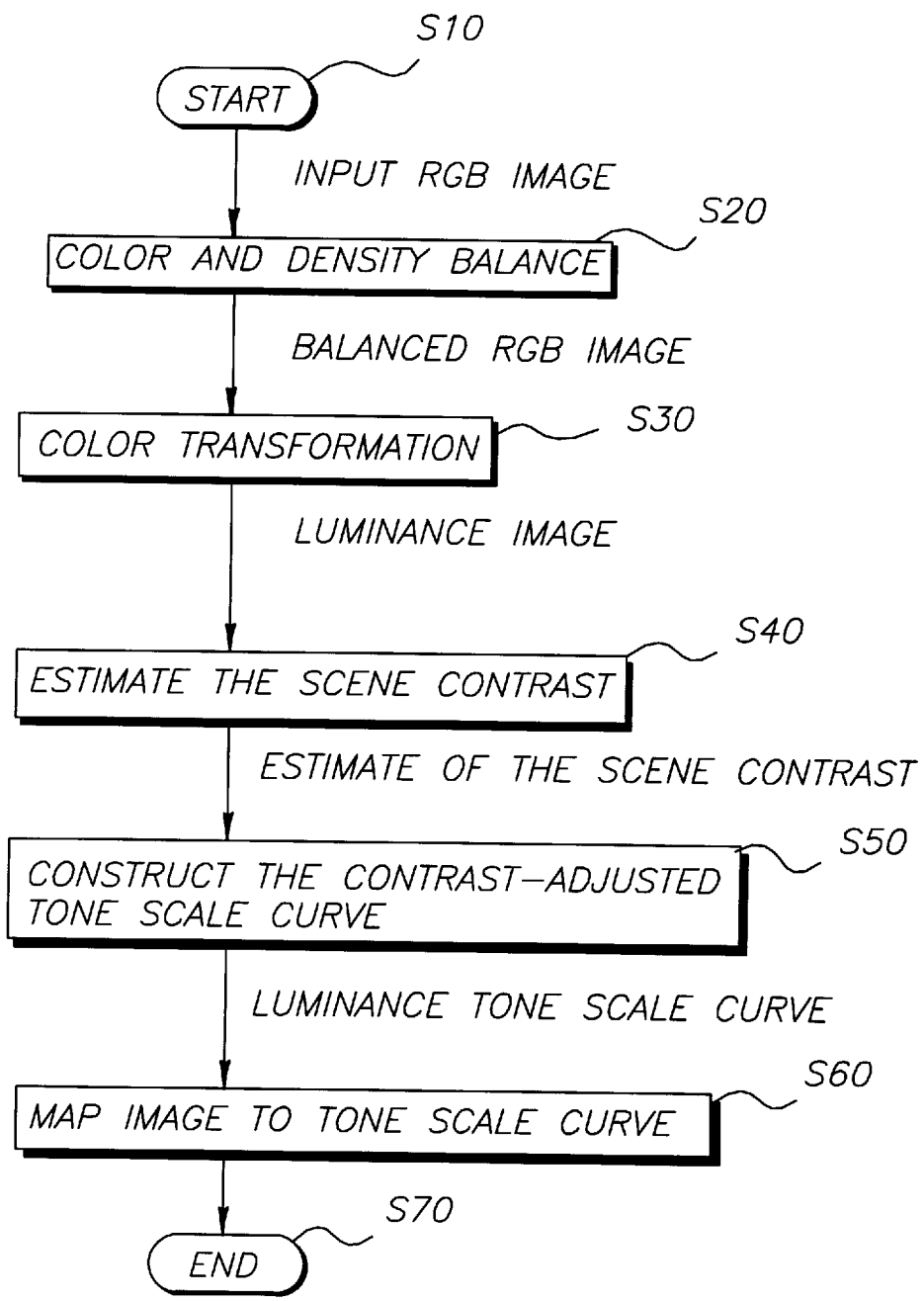
FIG. 2 illustrates a flowchart of a software program of the present invention.

Referring to FIG. 2, there is illustrated an overview of the software program of the present invention for estimating the input scene contrast and adjusting the output image contrast automatically. The software program is initiated S10, and the digital image is first processed with any well known color and density balance algorithm S20 to correct for color cast due to illumination and for exposure variation due to errors in the camera exposure control. The function of the color and density balance algorithm is for adjusting the red, green, and blue records of the input image so that some chosen digital code values are printed (or displayed) to a medium gray in the output media. For example, the digital code values (R,G,B)=(2000, 2000, 2000) are printed on the output photographic paper at status A densities (0.8, 0.8, 0.8).

After the image has been color and density balanced, any well known color transform is applied S30 to the balanced image so that the RGB signal is transformed into any suitable color space that has one (luminance) component representing the lightness variation and two (chrominance) components representing the chromatic variation in the image. The following color space is preferred:

Luminance: $Cl = (R + G + B)/\sqrt{3}$

Chrominance: $Cs = (R - B)/\sqrt{2}$

Chrominance: $Ct = (2G - R - B)/\sqrt{6}$ where R,G,B are the red, green, and blue log-exposures, although any other perception based space may also be used, such as CIELAB. It is instructive to note that in the present invention the contrast of the luminance component is adjusted independently from that of the chrominance component.

Next, the scene contrast is estimated S40 from the luminance component of the input image, as will be described in detail below in reference to FIG. 3. A tone scale curve is then constructed S50 from the estimated scene contrast, and the luminance image is then mapped S60 through the tone scale curve for adjusting the tone scale, as will also be described in detail below. The program may then be exited S70, and the digital image printed after the luminance image has been properly combined with the chrominance images by the following inverse transform:

$$R = Cl/\sqrt{3} + Cs/\sqrt{2} - Ct/\sqrt{6}$$

$$G = Cl/\sqrt{3} + 2Ct/\sqrt{6}$$

$$B = Cl/\sqrt{3} - Cs/\sqrt{2} - Ct/\sqrt{6}$$

Alternatively, the results of the program may be further processed by other well known image processing programs for further processing the image.

Figure 3:
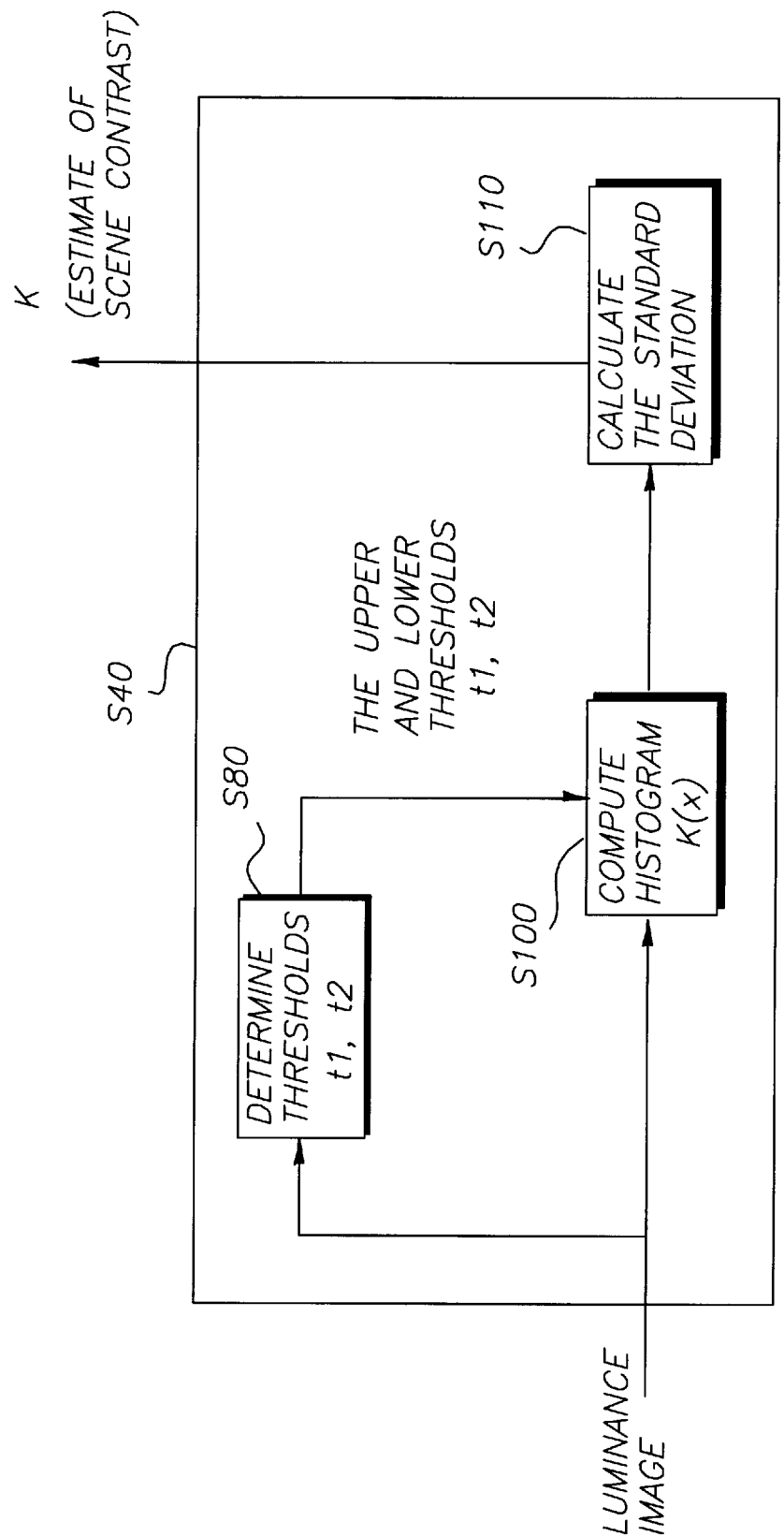
FIG. 3 illustrates in detail a portion of the software program and, more specifically, the procedure for estimating the scene contrast.

Referring to FIG. 3, there is illustrated the step of estimating the scene contrast S40. First, two thresholds (the lower and the upper thresholds) are determined S80 for a Laplacian response, as will be illustrated in detail in FIG. 4. Then, the two thresholds are used in deciding which pixels should be sampled from the digital image for further analysis in eventually determining the tone scale curve. A histogram K(x) is derived from the sampled pixels is created S100 and its standard deviation (k) is calculated S110, where x denotes the input code value. The output k is used as an estimate of the scene contrast Output k is used as an estimate of the standard deviation because of the previously stated correlation between the standard deviation and the scene contrast.

Figure 4:
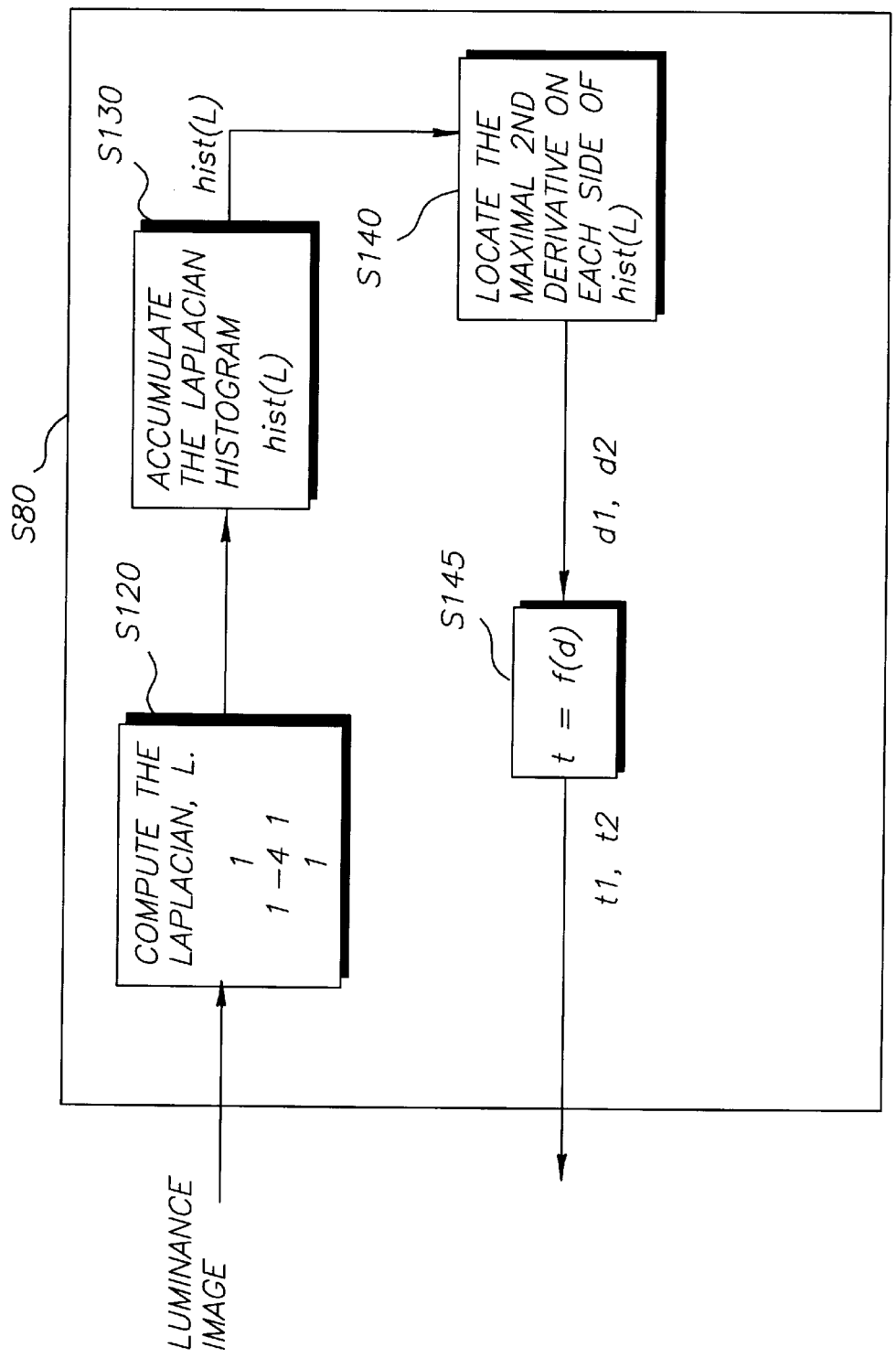
FIG. 4 illustrates in detail a portion of the software program and, more specifically, the procedure for determining thresholds in pixel sampling.

Referring to FIG. 4, there are illustrated the details of the step for determining the thresholds S80. The well known Laplacian operator is applied S120 to the input luminance image and the Laplacian response, L, for each pixel is calculated S130 to form the Laplacian histogram, hist(L). A typical Laplacian kernel is illustrated in block S120, although any Laplacian kernel may be used. (see *The Image Processing Handbook*, Second Edition, pages 225–232, for further discussion)

The Laplacian histogram, hist(L), can be well approximated by a mixture model:

$$h(L) = \frac{a}{\sqrt{2\pi\sigma}} e^{-\frac{L^2}{2\sigma^2}} + \frac{1-a}{2\lambda} e^{-\frac{|L|}{\lambda}},$$

where $0 \leq a \leq 1$, $\sigma$ is the standard deviation of the Gaussian component, and $\lambda$ is the decay constant of the double-exponential component. Since the first term represents pixels from uniform and texture areas, the thresholds should be selected at substantially $\pm 2\sigma$ to $\pm 3\sigma$. It is possible to determine the parameter $\sigma$ from a least square fit of the model, but a more efficient approximation is to take the second derivative of hist(L) S140, and find the local maxima along the negative and the positive axis, as described in detail below.

Mathematically, we want to locate zeroes in the third derivative:

$$\frac{d^3h}{dL^3} = \frac{a}{\sqrt{2\pi\sigma^5}} L \left(3 - \frac{L^2}{\sigma^2}\right) e^{-\frac{L^2}{2\sigma^2}} - \frac{1-a}{2\lambda^4} e^{-\frac{|L|}{\lambda}} = 0$$

For consumer images, $\sigma 0$ is much smaller than $\lambda$, and the zeroes are approximately located at $d_1 \sim -\sqrt{3}\sigma$ and $d_2 \sim +\sqrt{3}\sigma$. Therefore, in the preferred embodiment of the invention, the thresholds, $t_1$ and $t_2$, are selected S145 at $t_1 = f(d_1) = 1.5 d_1$ and $t_2 = f(d_2) = 1.5 d_2$, i.e. at approximately $\pm 2.6\sigma$, which will exclude 99% of all the pixels from the uniform and texture areas and will exclude 99% of the pixels containing noise.

Figure 5:
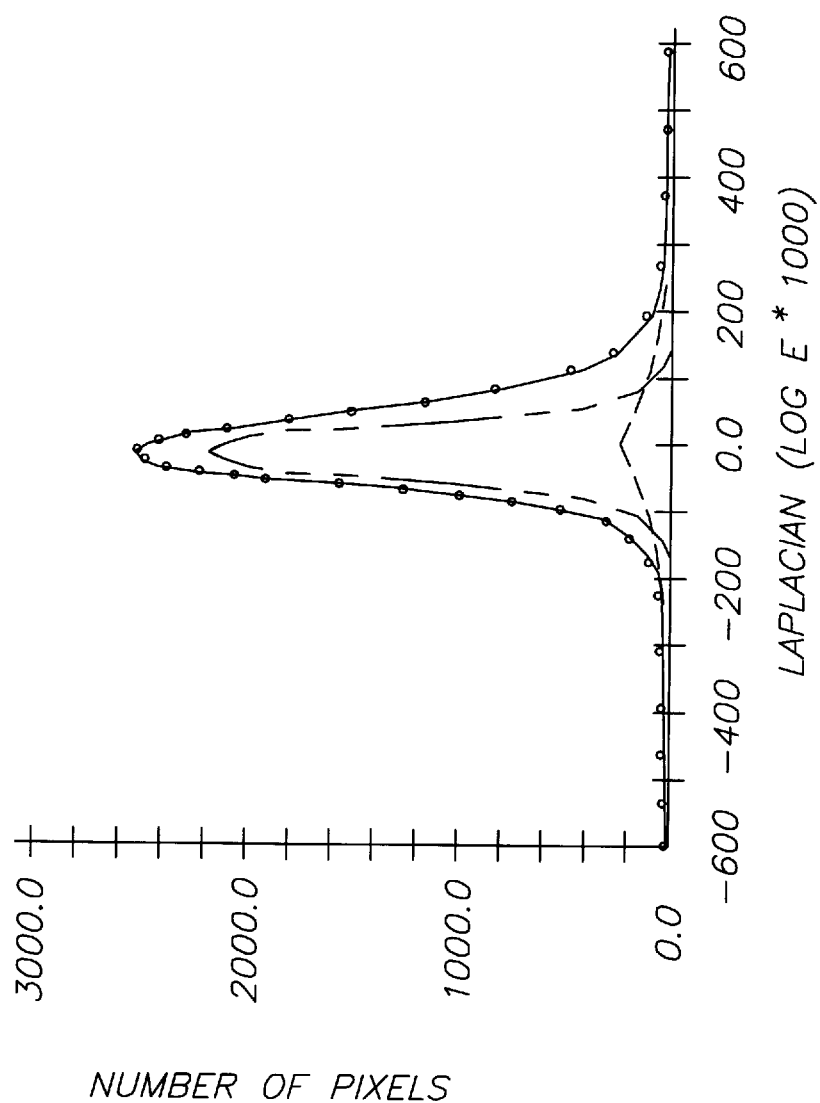
FIG. 5 illustrates an example of a typical Laplacian histogram, hist(L), of an image.
Figure 6:
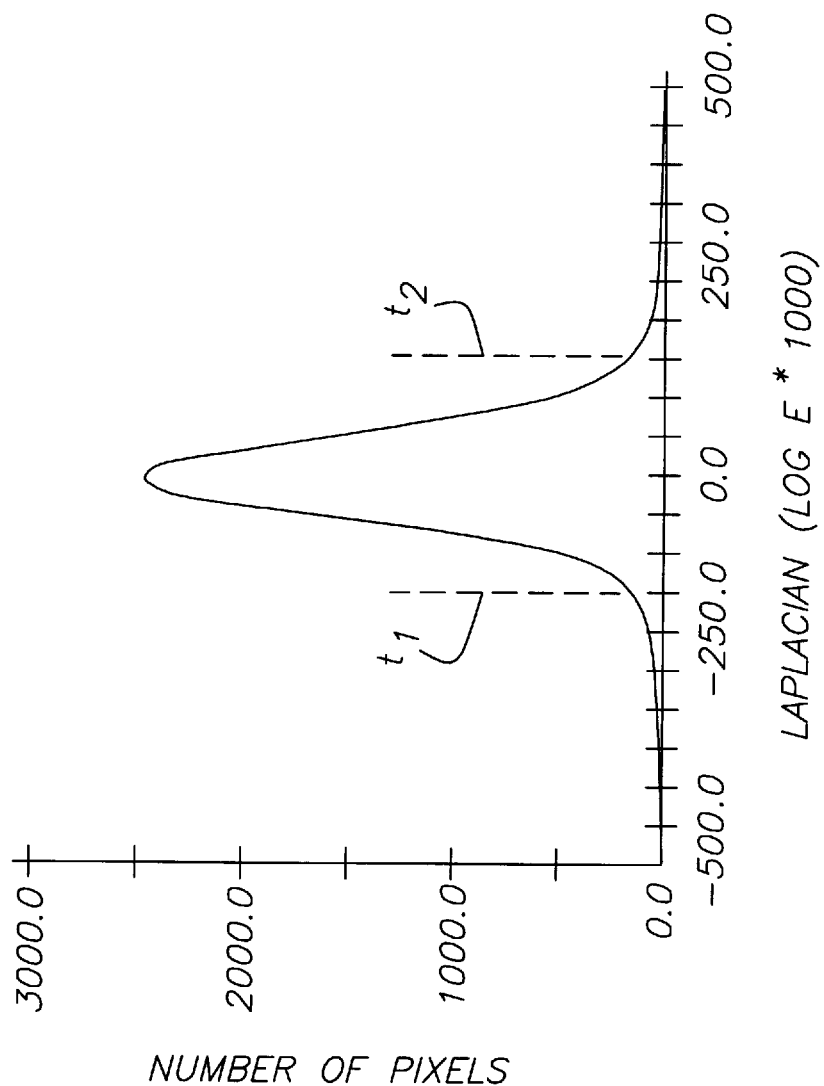
FIG. 6 illustrates the locations of the lower and upper thresholds as determined from the Laplacian histogram, hist(L), of FIG. 5.

FIG. 5 illustrates an example of the Laplacian histogram of a consumer image. The circles are the data points, the thick solid curve is the mixture model, and the two thin, dashed curves are the two components of the mixture model. FIG. 6 depicts where the lower and the upper thresholds, $t_1$ and $t_2$, are located by the method of maximal second derivative.

Figure 7:
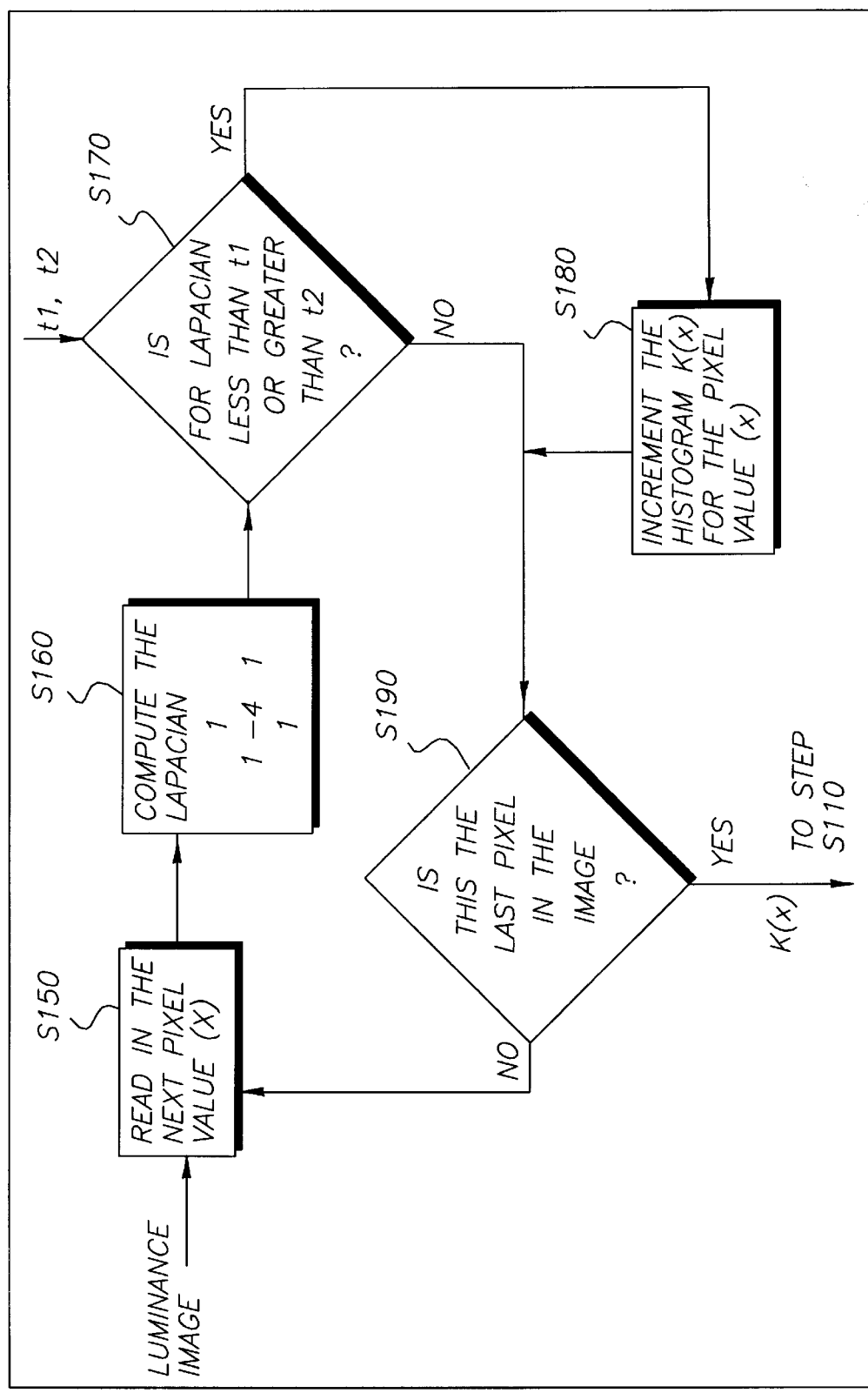
FIG. 7 illustrates in detail a portion of the software program and, more specifically, sampling pixels from the original image.

After the two thresholds are determined, FIG. 7 illustrates how the pixels are sampled and the histogram K(x) is computed S100. For each pixel with a code value (x) in the input image S150, its Laplacian value is computed S160. If its Laplacian value is greater than the upper threshold or less than the lower threshold S170, then the pixel is retrieved or sampled and the histogram K(x) is incremented S180 by 1 at code value x. This sampling and incrementing is repeated for the entire image S190. After the calculation of the histogram K(x) is completed, the standard deviation, k, of K(x) is then computed as an estimate of the scene contrast.

Figure 8:
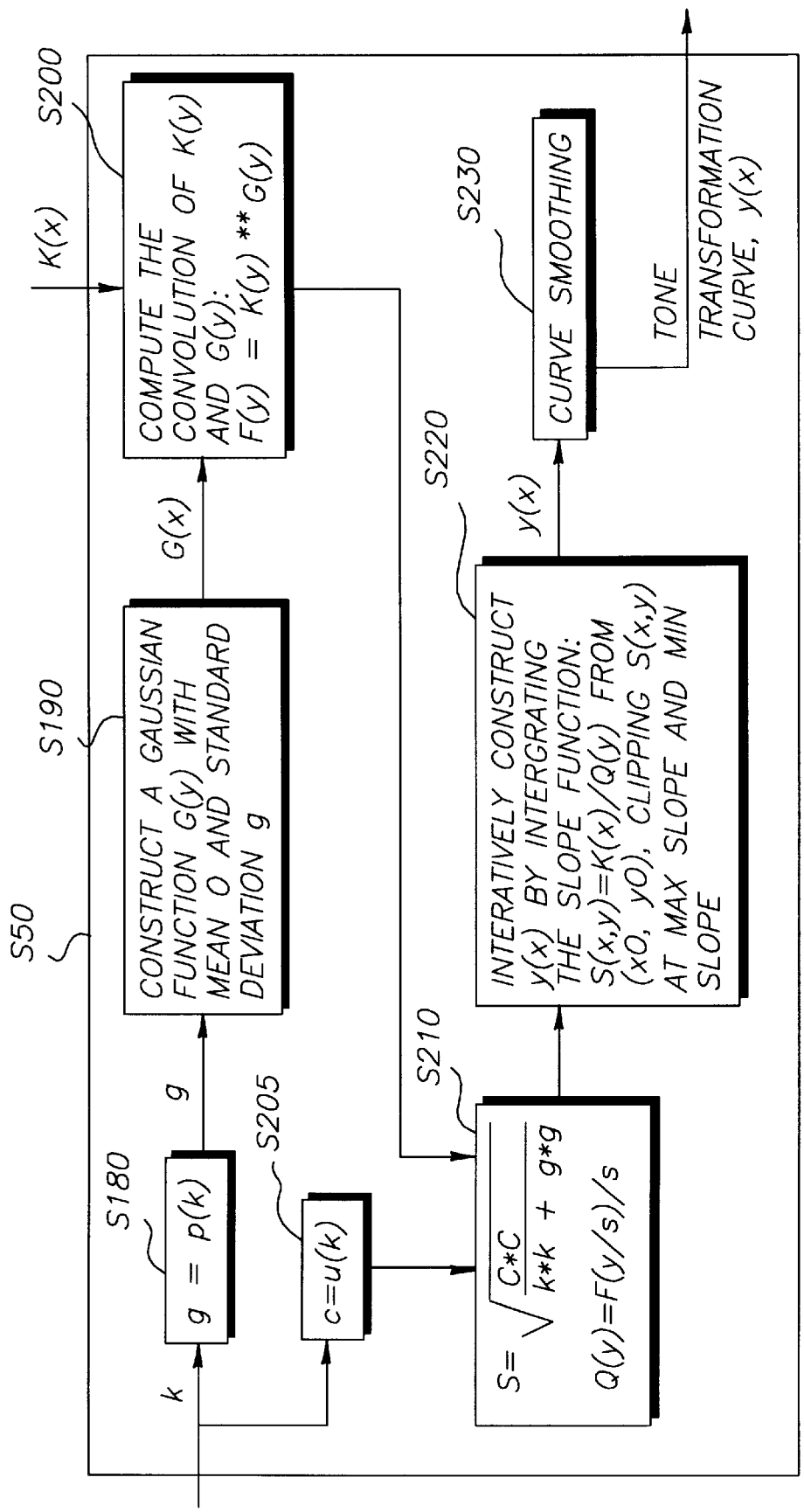
FIG. 8 in detail a portion of the software program and, more specifically, the procedure for constructing the contrast-adjusted tone scale curve for the luminance signal.

Referring to FIG. 8, once the scene contrast estimate, k, is computed, the tone scale is computed S50. First, a target histogram, Q(y), is computed and thereafter the desired tone transformation curve y(x) using a finite-difference stepwise construction procedure is constructed, where y denotes the output code value.

The target histogram, Q(y), is computed by convolving the sample histogram K(y) with a Gaussian distribution G(y), and then by scaling the resulting function with a scaling factor, s. The standard deviation g of G(y) determines the shape of the target function. If g>>k, then the target function Q(y) is essentially a Gaussian distribution. In this case, the tone transformation curve, y(x), will map K(x) to a Gaussian distribution. If g<<k, then the target function Q(y) will have essentially the same shape as K(x). In this case, the tone transformation curve, y(x), is essentially a straight line. Its slope determines the global contrast adjustment. Therefore, the single parameter, g, allows the user to control the desired manipulation of the characteristics of the tone transformation curve. In the general case, g is adjusted according to the shape parameters of the histogram K(x) by a function p(k) S180. It is instructive to note that other factors may be used as arguments of p(k) in the determination of g. For example, if the skewness of K(x) is large, the value of g can be made small, so that the target histogram, Q(y), also has a large skewness. In the simplest implementation, g is made to be a function, p(k), of the scene contrast estimate, k, alone. Experimental results show that a simple function, g=p(k)=k is sufficient to produce very pleasing images. Once the standard deviation g is determined, the function G can be constructed S190. This choice of g=k produces a target function Q(y) that is halfway between K(x) and a Gaussian distribution as a result of the convolution of K(y) and G(y) S200.

The variance of the convolution product, F(y), of K(y) and G(y) is the sum of the variances of K(y) and G(y), i.e., $k^2+g^2$. Consequently, F(y) has a wider spread than the input sampled histogram K(x). If the goal is only to change the shape, but not the spread, of the histogram, then F(y) has to be scaled down back to the same variance as that of K(x). However, the goal of digital printing is to adjust the image contrast to produce a pleasing reproduction of the input image. This is achieved by adjusting the standard deviation, c, of the target histogram. For this purpose, a scaling factor S210, $$s = \sqrt{\frac{c*c}{k*k + g*g}},$$

is used to control the final spread of the target function, Q(y). It is used to scale the convolution product, F(y), to get Q(y):

$$Q(y) = \frac{1}{s} F\left(\frac{y}{s}\right).$$

Figure 9:
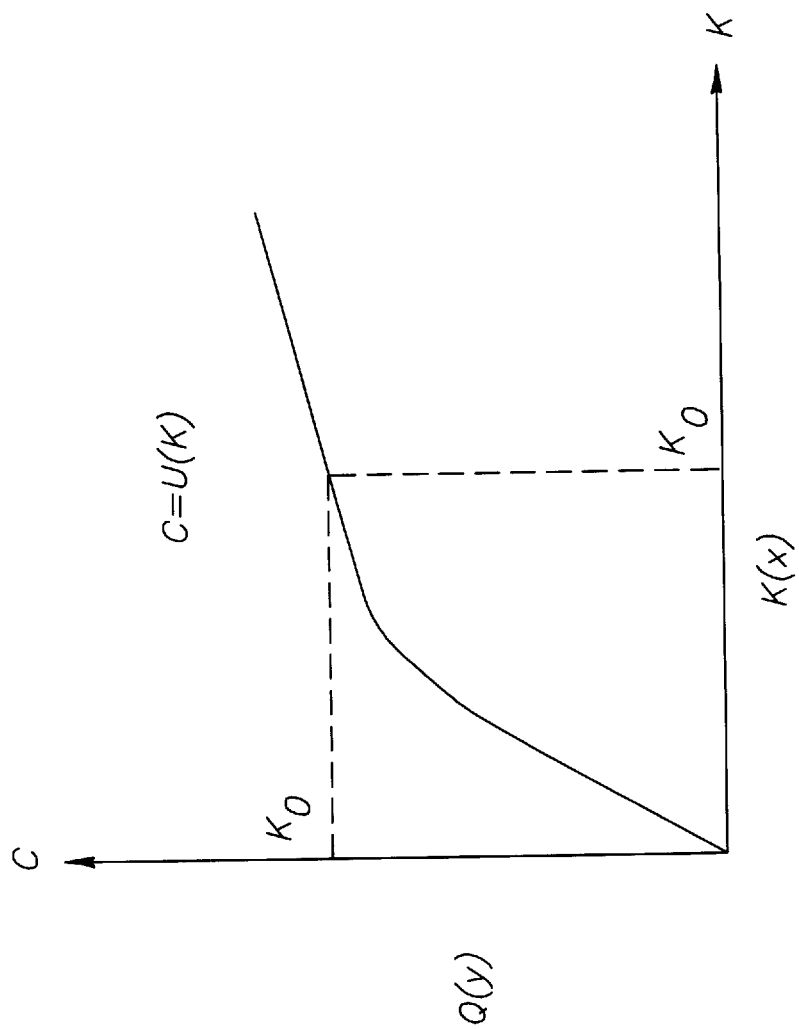
FIG. 9 illustrates the function that is used to determine the standard deviation of the target histogram from the standard deviation of the input histogram.
Figure 10:
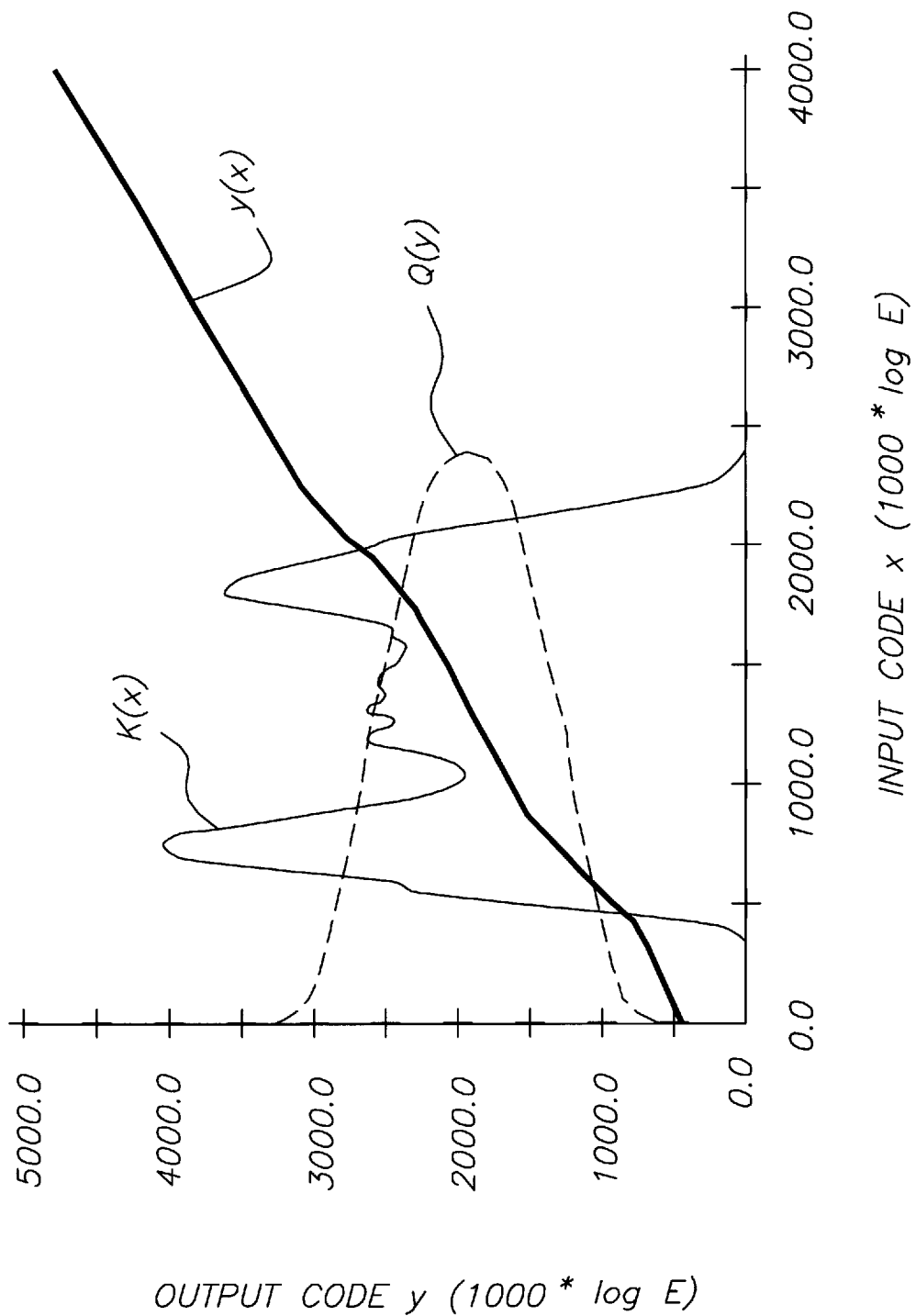
FIG. 10 illustrates the construction of the tone transformation curve y(x) from the input histogram K(x) and the target histogram Q(y).

Referring to FIG. 9, the standard deviation, c, of the target histogram Q(y), is determined from a function u of the standard deviation of the input histogram K(x). If c=k, then the target function Q(y) will have the same standard deviation as K(x), resulting in no adjustment of global contrast. If c is chosen to be greater than k, then the global contrast will be increased. Therefore, if we make c a function of k, i.e., c=u(k) S205, then we can adaptively adjust the global contrast of the input image. For example, if k is smaller than the population mean contrast, $k_0$, then we should make c greater than k and thereby increase the image contrast. In the preferred embodiment of this invention, the function c=u(k) is implemented as a one-dimensional lookup table with the following functional form: $c=k_0(1-\exp[-k/k_1]+\exp[-k_0/k_1])$, when $k<k_0$, and $c=k_0+b*(k-k_0)$, when $k \geq k_0$, where $k_0$, $k_1$ and b are constants determined from population statistics.

Referring to FIG. 8 and 9, they illustrate the construction of the tone transformation curve y(x) from the input histogram K(x) and the target histogram Q(y). The procedure to construct the curve y(x) that maps one histogram, K(x), to another histogram, Q(y), is defined by the following equation:

$$\int_{-\infty}^{y} Q(\xi)d\xi = \int_{-\infty}^{x} K(\eta)d\eta.$$

Taking derivative on both sides, we have: Q(y)dy=K(x)dx, which can be solved by a finite-difference method with a boundary condition. Since the color and density balanced input image has a defined balanced point, say $x_0$, which is usually the point that will be mapped to the medium gray at the output, we can set the boundary condition of y(x) so that $y_0=y(x_0)=x_0$. This boundary condition requires that the target distribution Q(y) be translated along the y axis so that $$\int_{-\infty}^{y=x_0} Q(\xi)d\xi = \int_{-\infty}^{x_0} K(\eta)d\eta.$$

Therefore, the density balanced point is not changed by the tone transformation curve. However, if the output image is to be re-balanced again, then the particular selection of the boundary condition is not very important. Defining the slope function of y(x), S(x,y)=K(x)/Q(y), the finite-difference solution of y as a function of x is given S220 by:

$$y(x_{i+1}) = y(x_i) + S(x_i, y(x_i))(x_{i+1} - x_i),$$

starting with $y(x_1)=y(x_0)+S(x_0,y(x_0))(x_1-x_0)$ where $y(x_0)=x_0$.

The tone transformation curve so constructed may not be very smooth because of the discrete implementation in digital computers. In order to get a smooth curve, it may be desirable to smooth the curve by a low-pass filter S230, such as a Gaussian filter. The finite-difference method of constructing the tone transformation curve provides an easy way to impose the limits, MAXIMUM SLOPE and MINIMUM SLOPE, on the instantaneous slope $S(x_i, y(x_i))$. If at any step, the slope $S(x_i, y(x_i))$ exceeds the limits, then its value is clipped at the limits. Therefore, the resulting tone transformation curve is guaranteed to have its slope vary within the specified limits. This is a very important property of a good, practical tone transformation.

We claim:

1. A method of estimating the scene contrast from a digital image, the method comprising the steps of:
   a) determining a Laplacian value for value for each pixel of the digital image:
   b) forming a Laplacian histogram distribution based on the Laplacian values;
   c) determining, from the Laplacian histogram, first and second thresholds which eliminate substantially uniform areas or substantially textured portion of the digital image;
   d) selecting pixels which are based on the first and second thresholds from the digital image;
   e) forming an intensity histogram from the selected pixels;
   f) computing a standard deviation of the intensity histogram; and
   g) estimating contrast of the digital image by comparing the computed standard deviation with a predetermined contrast for determining contrast of the input image in relationship with the predetermined contrast.

2. The method of claim 1, wherein the step of determining the first and second thresholds includes finding a local maxima of a second derivative of the Laplacian histogram.

3. The method of claim 1, wherein the step of selecting the pixels includes selecting the pixels that exceed substantially the first threshold.

4. The method of claim 1, wherein the step of selecting the pixels includes selecting the pixels that are less than substantially the second threshold.

5. The method of claim 1 further comprising the step of computing a tone scale transformation curve from the estimate contrast of the digital image.

6. The method of claim 5 further comprising the step of constructing the tone transformation curve by modifying the intensity histogram formed from the selected pixels so that a target histogram is generated which said target histogram is dependent on the digital image.

7. The method of claim 6 further comprising the step of constructing a tone transformation curve by convolving the intensity histogram with another pre-defined function with image-dependent parameters.

8. The method of claim 7, wherein the predefined function is a Gaussian distribution.

9. The method of claim 1 further comprising forming a target histogram from the intensity histogram by convolving the intensity histogram with a pre-defined function, and constructing a tone scale curve by transforming the intensity histogram to the target histogram.

10. The method of claim 9, wherein the step of determining the first and second thresholds includes finding a local maxima of a second derivative of the Laplacian histogram.

11. The method of claim 9, wherein the step of selecting the pixels includes selecting the pixels that exceed substantially the first threshold.

12. The method of claim 9, wherein the step of selecting the pixels includes selecting the pixels that are less than substantially the second threshold.

13. A method of estimating the scene contrast from a digital image, the method comprising the steps of:
   a) determining a Laplacian value for each pixel of the digital image:
   b) forming a Laplacian histogram distribution based on the Laplacian values;
   c) determining, from the Laplacian histogram, first and second thresholds;

d) selecting pixels which are based on the first and second thresholds from the digital image;

e) forming an intensity histogram from the selected pixels;

f) forming a target histogram from the intensity histogram by convolving the intensity histogram with a pre-defined function; and g) constructing a tone scale curve by transforming the intensity histogram to the target histogram.

14. The method as in claim 13, wherein the step of forming a target histogram includes convolving the intensity histogram with a Gaussian distribution.

15. The method as in claim 14, wherein the step of forming a target histogram includes convolving the intensity histogram with the Gaussian distribution having a standard deviation substantially the same as the sampled histogram.

16. The method as in claim 13 further comprising the step of computing a standard deviation of the intensity histogram and estimating contrast of the digital image by comparing the computed standard deviation with a predetermined contrast for determining contrast of the input image in relationship with the predetermined contrast.

17. The method of claim 16, wherein the step of determining the first and second thresholds includes finding a local maxima of a second derivative of the Laplacian histogram.

18. The method of claim 17, wherein the step of selecting the pixels includes selecting the pixels that exceed substantially the first threshold.

19. The method of claim 18, wherein the step of selecting the pixels includes selecting the pixels that are less than substantially the second threshold.

20. The method of claim 19 further comprising the step of constructing the tone transformation curve by modifying the intensity histogram formed from the selected pixels so that an image-dependent target histogram is generated.

21. A computer program product for excluding pixels from a uniform portion or a texture portion of a digital image, comprising a computer readable storage medium having a computer program stored thereon for performing the steps of:

a) determining a Laplacian value for each pixel of the digital image;

b) forming a Laplacian histogram distribution based on the Laplacian values;

c) determining, from the Laplacian histogram, first and second thresholds which eliminate substantially the uniform portion or substantially the textured portion of the digital image; and d) selecting pixels which are based on the first and second thresholds from the digital image.

22. A method for excluding pixels from a uniform portion or a texture portion of a digital image, comprising the steps of:

a) determining a Laplacian value for each pixel of the digital image:

b) forming a Laplacian histogram distribution based on the Laplacian values;

c) determining, from the Laplacian histogram, first and second thresholds which eliminate substantially the uniform portion or substantially the textured portion of the digital image; and d) selecting pixels which are based on the first and second thresholds from the digital image.

23. The method of claim 22, wherein the step of determining the first and second thresholds includes finding a local maxima of a second derivative of the Laplacian histogram.

24. A computer program product for estimating the scene contrast from a digital image, comprising: a computer readable storage medium having a computer program stored thereon for performing the steps of:

a) determining a Laplacian value for each pixel of the digital image;

b) forming a Laplacian histogram distribution based on the Laplacian values;

c) determining, from the Laplacian histogram, first and second thresholds which eliminate substantially uniform areas or substantially textured portion of the digital image;

d) selecting pixels which are based on the first and second thresholds from the digital image;

e) forming an intensity histogram from the selected pixels;

f) computing a standard deviation of the intensity histogram; and g) estimating contrast of the digital image by comparing the computed standard deviation with a predetermined contrast for determining contrast of the input image in relationship with the predetermined contrast.

25. The computer program product as in claim 24, wherein the step of determining the first and second thresholds includes finding a local maxima of a second derivative of the Laplacian histogram.

26. The computer program product as in claim 24, wherein the step of selecting the pixels includes selecting the pixels that exceed substantially the first threshold.

27. The computer program product as in claim 24, wherein the step of selecting the pixels includes selecting the pixels that are less than substantially the second threshold.

28. The computer program product as in claim 24 further comprising the step of computing a tone scale transformation curve from the estimate contrast of the digital image.

29. The computer program product as in claim 28 further comprising the step of constructing the tone transformation curve by modifying the intensity histogram formed from the selected pixels so that a target histogram is generated which said target histogram is dependent on the digital image.

30. The computer program product as in claim 29 further comprising the step of constructing a tone transformation curve by convolving the intensity histogram with another pre-defined function with image-dependent parameters.

31. The computer program product as in claim 30, wherein the pre-defined function is a Gaussian distribution.

32. The computer program product as in claim 24 further comprising forming a target histogram from the intensity histogram by convolving the intensity histogram with a pre-defined function, and constructing a tone scale curve by transforming the intensity histogram to the target histogram.

33. The computer program product as in claim 32, wherein the step of determining the first and second thresholds includes finding a local maxima of a second derivative of the Laplacian histogram.

34. The computer program product as in claim 32, wherein the step of selecting the pixels includes selecting the pixels that exceed substantially the first threshold.

35. The computer program product as in claim 32 wherein the step of selecting the pixels includes selecting the pixels that are less than substantially the second threshold.

36. A computer program product for estimating the scene contrast from a digital image, comprising: a computer readable storage medium having a computer program stored thereon for performing the steps of:

a) determining a Laplacian value for each pixel of the digital image:

b) forming a Laplacian histogram distribution based on the Laplacian values;

c) determining, from the Laplacian histogram, first and second thresholds;

d) selecting pixels which are based on the first and second thresholds from the digital image;

e) forming an intensity histogram from the selected pixels;

f) forming a target histogram from the intensity histogram by convolving the intensity histogram with a predefined function; and g) constructing a tone scale curve by transforming the intensity histogram to the target histogram.

37. The computer program product as in claim 36, wherein the step of forming a target histogram includes convolving the intensity histogram with a Gaussian distribution.

38. The computer program product as in claim 37, wherein the step of forming a target histogram includes convolving the intensity histogram with the Gaussian distribution having a standard deviation substantially the same as the sampled histogram.

39. The computer program product as in claim 36 further comprising the step of computing a standard deviation of the intensity histogram and estimating contrast of the digital image by comparing the computed standard deviation with a predetermined contrast for determining contrast of the input image in relationship with the predetermined contrast.

40. The computer program product as in claim 39, wherein the step of determining the first and second thresholds includes finding a local maxima of a second derivative of the Laplacian histogram.

41. The computer program product as in claim 40, wherein the step of selecting the pixels includes selecting the pixels that exceed substantially the first threshold.

42. The computer program product as in claim 41, wherein the step of selecting the pixels includes selecting the pixels that are less than substantially the second threshold.

43. The computer program product as in claim 42 further comprising the step of constructing the tone transformation curve by modifying the intensity histogram formed from the selected pixels so that an image-dependent target histogram is generated.

* * * * *

UNITED STATES PATENT AND TRADEMARK OFFICE
CERTIFICATE OF CORRECTION

PATENT NO.    : 5,822,453
DATED         : October 13, 1998
INVENTOR(S)   : Hsien-Che Lee, et al It is certified that error appears in the above-identified patent and that said Letters Patent is hereby corrected as shown below:

Col. 5, line 59     --"~" should be -- ≈ -- in the two instances in which it appears on this line--

Signed and Sealed this

Eighteenth Day of May, 1999

*Attest:*

Q. TODD DICKINSON

*Attesting Officer*   Acting Commissioner of Patents and Trademarks